June 13, 1950 P. ORR 2,511,539
FIVE-SPEED TRANSMISSION
Filed Oct. 9, 1947
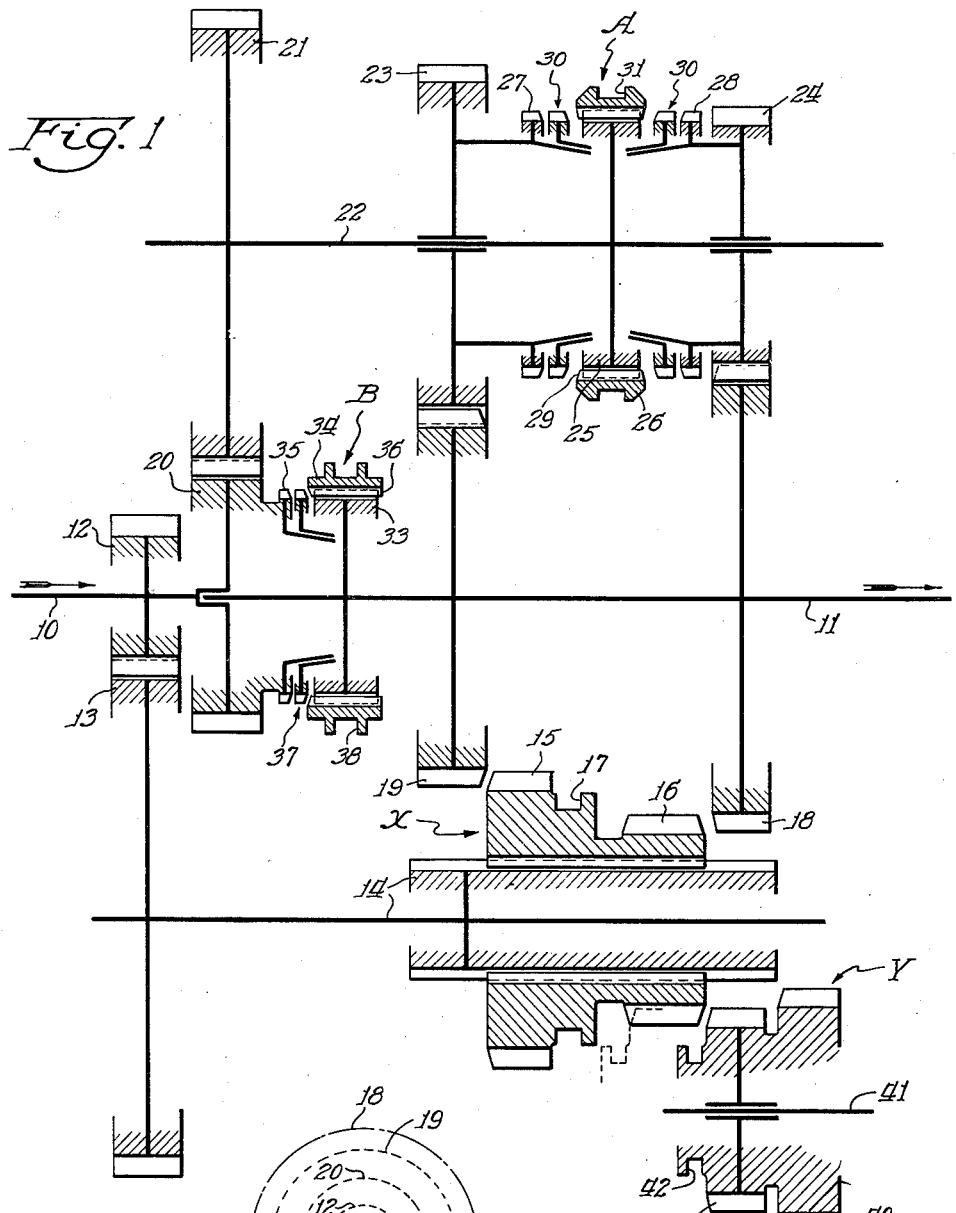
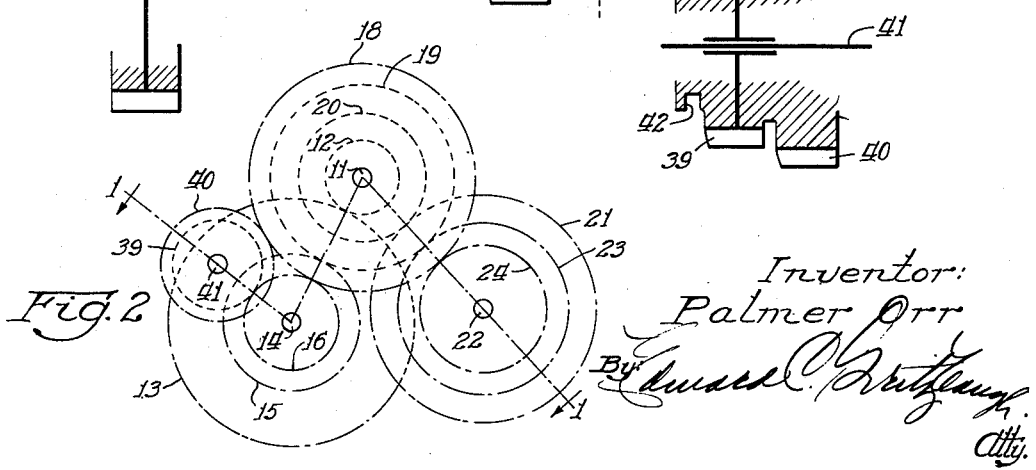
Fig. 1
Fig. 2
Inventor:
Palmer Orr
By [signature]
Atty.

Patented June 13, 1950

2,511,539

UNITED STATES PATENT OFFICE 2,511,539

FIVE-SPEED TRANSMISSION

Palmer Orr, Muncie, Ind., assignor to Borg-Warner Corporation, Chicago, Ill., a corporation of Illinois Application October 9, 1947, Serial No. 778,797

1 Claim. (Cl. 74—331)

This invention relates to change speed transmissions and more particularly to transmissions of the countershaft, constant mesh gear type.

The principal object of this invention is to provide a transmission of the type indicated and particularly adapted for use with heavy trucks and capable of at least five changes of speed in a forward direction.

Another object of my invention is to provide a transmission which, in addition to five forward speeds, provides for reverse drive, and one which is efficient in operation and compact in both breadth and length, and employs a minimum number of gears.

A further object of my invention is to provide a transmission of the type described wherein the various combinations of constant mesh gears are selectively rendered operative in the establishment of the higher forward speed ratios incorporating blocker-type synchronizers.

Other objects, advantages, and uses of the invention will become more apparent after reading the following specification and claim, and after consideration of the drawing forming a part of the specification wherein:

Fig. 1 is a diagrammatic sectional view of a transmission embodying the invention, the section being taken as indicated by the line 1—1 of Fig. 2;

Fig. 2 is a rear elevation illustrating the true relative positions of the shafts and the manner in which the gears mesh with each other.

As an example of one form in which the invention may be embodied, I have shown in the accompanying drawing a five-speed transmission adapted for use in motor trucks, comprising a drive or input shaft 10 having suitable operative connection with a motor or engine (not shown), and a driven or output shaft 11 disposed in axial alignment with drive shaft 10. Integral with the drive shaft 10 is a gear 12 having constant mesh with a gear 13 carried by a countershaft 14. The countershaft 14 has slidably splined thereon a shiftable gear cluster X comprising the gears 15 and 16. The gear cluster X has a groove 17 adapted to receive a shifter fork (not shown) for moving the gear 16 to the right into mesh with a gear 18 fixed to the driven shaft 11 or for moving the gear 15 into mesh with a gear 19 fixed to the driven shaft 11 for establishing first and second speed ratios respectively as will be explained hereinafter.

The drive shaft 10 also has a gear 20 at one end thereof in constant mesh with a larger gear 21 fixed to a countershaft 22. The countershaft 22 has rotatably mounted thereon a pair of gears 23 and 24 respectively, the gear 23 being in constant mesh with the gear 19 fixed to the driven shaft 11 and the gear 24 being in constant mesh with the gear 18 fixed to the driven shaft 11. For the purpose of establishing third and fourth speed ratios, I provide a two-way clutch mechanism generally designated A and comprising a hub member 25 fixed to the countershaft 22, a slidable clutch sleeve 26 drivingly connected to and axially shiftable on the rim of the hub member 25, and jaw clutch teeth 27 and 28 fixed to the gears 23 and 24 respectively and adapted to be engaged by the clutch teeth 29 of the shiftable jaw clutch sleeve 26. The internal teeth 29 of the clutch sleeve mesh with corresponding external teeth on the hub member 25 in order to provide the above-mentioned slidable driving connection between the sleeve and hub member.

Between the shiftable jaw clutch sleeve 25 and the gears 23 and 24, I interpose synchronizing mechanism of the type shown in U. S. Patent No. 2,221,900 issued November 19, 1940, in the name of S. O. White and Bruce Barr. Such mechanism is indicated generally at 30 and functions to synchronize the jaw clutch sleeve 26 with the members into which it is moved into engagement, just prior to such engagement. For shifting the clutch sleeve 26, a groove 31 is provided in a periphery of the sleeve.

To establish the fifth forward speed ratio or direct drive, the gear 20 on the drive shaft 10 is adapted to be connected to the driven shaft 11 by a two-way clutch mechanism B similar to that previously described and comprising a hub 33 fixed to the driven shaft 11, a slidable clutch sleeve 34 drivingly connected to and axially slidable on the rim of the hub member 33, and jaw clutch teeth 35 fixed to the gear 20 and adapted to be engaged by the clutch teeth 36 of the shiftable jaw clutch sleeve 34. Between the shiftable jaw clutch sleeve 34 and the gear 20, there is interposed synchronizing mechanism shown in the above-noted Patent No. 2,221,900 and accordingly such synchronizing mechanism, indicated generally at 37, will function to synchronize the jaw clutch sleeve 34 and the gear 20 with which it may be moved into engagement, just prior to such engagement. The jaw clutch sleeve 34 is provided with a groove 38 in its periphery for shifting the sleeve 34.

A reverse gear or idler cluster Y comprising the gears 39 and 40, is rotatably mounted on a stub shaft 41 and the gear cluster is provided with a groove 42 for shifting the gear cluster to the left to mesh the teeth of the gear 39 with the teeth of the gear 16 and the teeth of the gear 40 with the teeth of the gear 18 for establishing reverse drive. The gear cluster is provided with a groove 42 adapted to receive a shift fork (not shown) so that the cluster may be shifted axially on the shaft 41.

In the operation of the transmission, drive is constantly transmitted from the drive shaft 10 to the countershaft 14 by means of the train of constant mesh gears 12 and 13 and drive is also constantly transmitted from the drive shaft 10 to the countershaft 22 through the train of constant mesh gears 20 and 21. Describing the establishment of the various speed ratios of the transmission and referring to Fig. 1, a first speed ratio or low gear is obtained by shifting the gear cluster X to the right to mesh the gear 16 thereof with the gear 18. Drive is thereby transmitted from the drive shaft 10 and the gear 12 to the gear 13, the countershaft 14, and the gear train, comprising the meshing gears 16 and 18 to the driven shaft 11.

To obtain the second speed ratio, the gear cluster X is moved to the left to mesh the teeth of the gear 15 with the teeth of the gear 19. The drive is then from the drive shaft 10 and gear 12 to the rear 13 and countershaft 14 and through the gear train comprising the gear 15 and the gear 19 to the driven shaft 11.

To obtain third speed forward, the gear cluster X is returned to neutral position and the clutch sleeve 26 of the clutch mechanism A is moved to the right into engagement with the clutch teeth 28 to connect the gear 24 to the countershaft 22. The drive is then from the drive shaft 10 and gear 20 to the gear 21, countershaft 22, hub 25, clutch sleeve 26, teeth 28, and the gear train comprising the gears 24 and 18 to the driven shaft 11.

To obtain fourth speed forward, the clutch sleeve 26 is moved to the left into engagement with the clutch teeth 27 to connect the gear 23 to the countershaft 22. The drive is then from the drive shaft 10 and the gear 20 to gear 21, countershaft 22, hub 25, clutch sleeve 26, teeth 27 and thereby the gear train comprising the gears 23 and 19 to the driven shaft 11.

To obtain fifth speed forward or direct drive, the clutch sleeve 26 is returned to neutral position and the clutch sleeve 34 of the clutch mechanism B is moved into engagement with the clutch teeth 35 whereby the drive shaft 10 and driven shaft 11 will be directly connected together by means of the hub 33, fixed to the driven shaft 11, the clutch sleeve 34, teeth 35 connected to the gear 20 integral with the drive shaft 10.

Reverse drive is obtained by shifting the clutch sleeve 34 and clutch sleeve 26 to their neutral positions and shifting the gear cluster Y comprising the gears 39 and 40 to the left to engage the gear 39 with the gear 16 on the countershaft 14 and to mesh the gear 40 with the gear 18 fixed to the driven shaft 11.

It will be apparent that any conventional shifting linkage whereby the various sequences of shifting operations may be obtained, may be employed for this purpose.

While I have described my invention in connection with one specific embodiment thereof it is to be understood that this is by way of illustration and not by way of limitation and the scope of my invention is defined solely by the appended claim which should be construed as broadly as the prior art will permit.

I claim:

In a transmission, aligned driving and driven shafts, a pair of countershafts, gear trains connecting said driving shaft with each countershaft, a plurality of gear trains for transmitting drives of varying ratios from said countershafts to said driven shaft and comprising a pair of gears fixed to said driven shaft, gears rotatable on one of said countershafts meshing with said driven shaft gears, clutch means for selectively drivingly connecting either of said rotatable gears to the countershaft, and gears rotatable with the other of said countershafts and axially shiftable into engagement with said driven shaft gears, and a reverse gear train comprising a pair of gears axially shiftable into mesh respectively with one of said driven shaft gears and one of said axially shiftable gears.

PALMER ORR.

REFERENCES CITED

The following references are of record in the file of this patent:

UNITED STATES PATENTS

| Number | Name | Date |
|---|---|---|
| 1,724,202 | Jacobs | Aug. 13, 1929 |
| 2,010,161 | Robbins | Aug. 6, 1935 |
| 2,017,906 | Lapsley | Oct. 22, 1935 |
| 2,310,310 | Peterson | Feb. 9, 1943 |
| 2,319,496 | Fishburn | May 18, 1943 |
| 2,356,522 | Kummich | Aug. 22, 1944 |

FOREIGN PATENTS

| Number | Country | Date |
|---|---|---|
| 119,098 | Great Britain | Sept. 26, 1918 |
| 835,361 | France | Dec. 20, 1938 |